Feb. 8, 1938.  F. RODEGHIER  2,107,344
HYDRAULIC CLUTCH
Filed Feb. 24, 1937  2 Sheets-Sheet 2
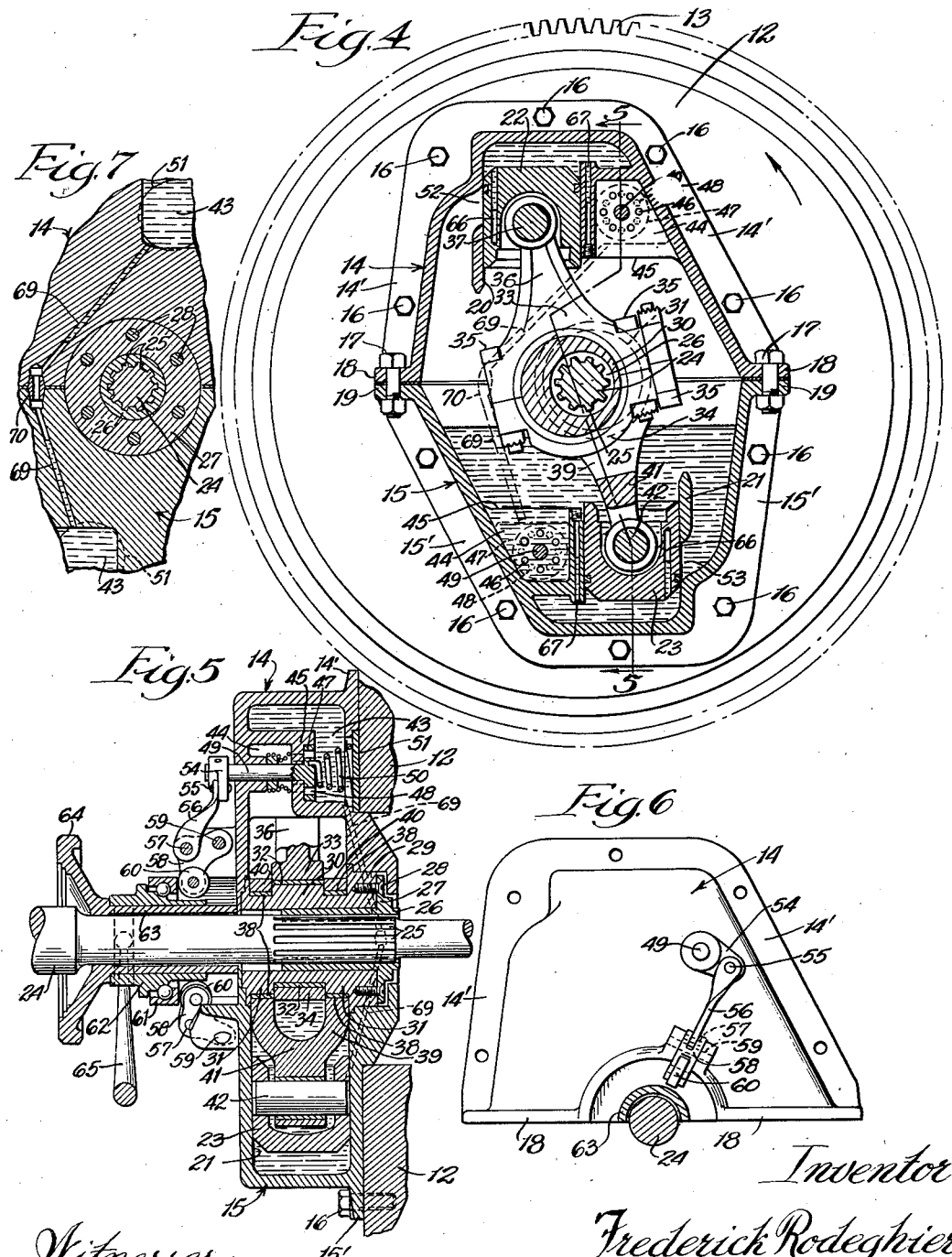
Inventor:
Frederick Rodeghier,
By Fisher, Clapp, Soans & Pond,
Attorneys.

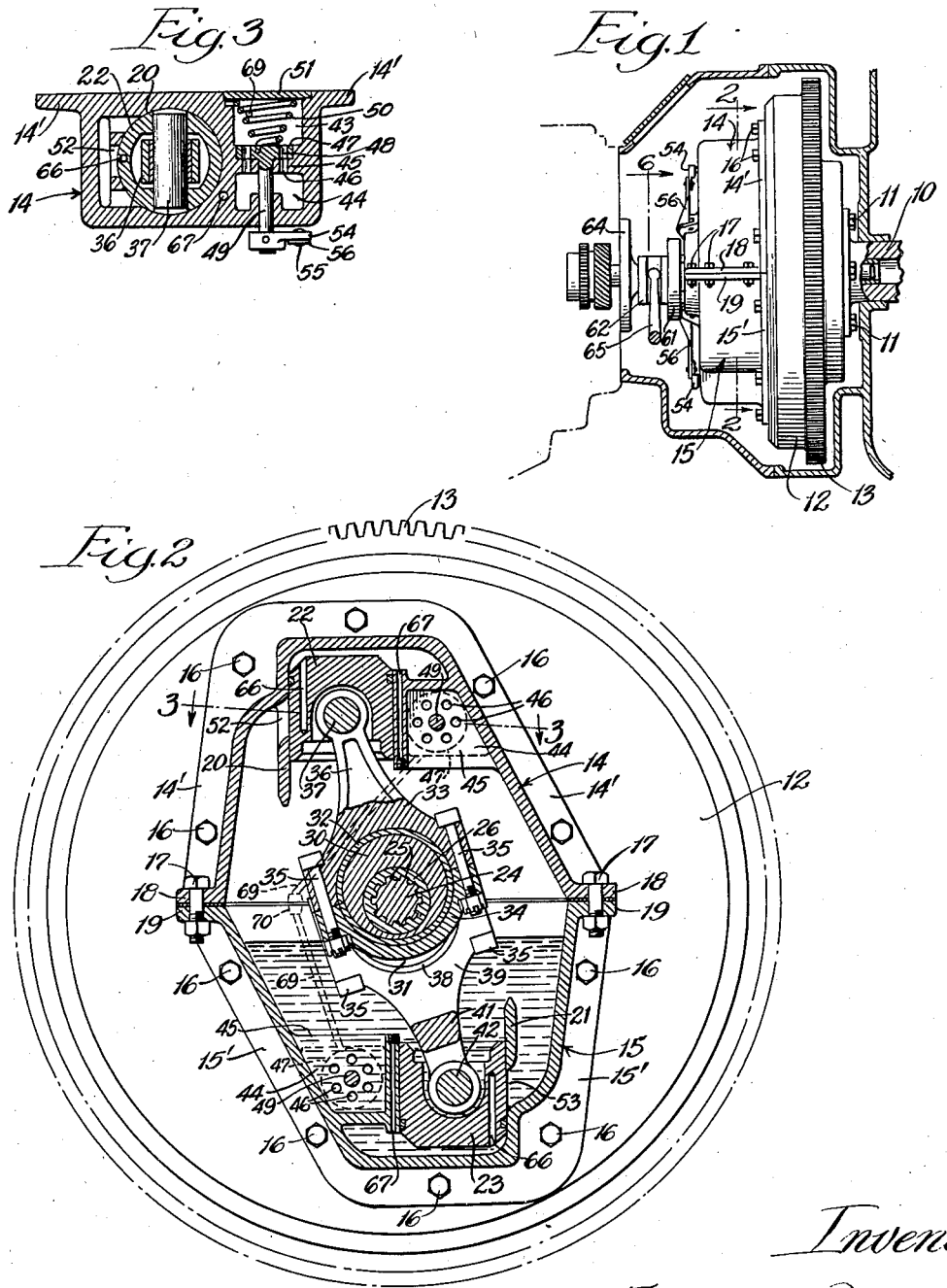

Patented Feb. 8, 1938

2,107,344

UNITED STATES PATENT OFFICE 2,107,344

HYDRAULIC CLUTCH

Frederick Rodeghier, Joliet, Ill.

Application February 24, 1937, Serial No. 127,484

12 Claims. (Cl. 192—60)

This invention relates to hydraulic clutches of the type designed to connect and disconnect the drive from a power shaft to a driven shaft in endwise alignment therewith; and the present invention is in the nature of an improvement upon the hydraulic clutch forming the subject matter of my Letters Patent No. 2,018,743, granted October 29, 1935.

The clutch of both my aforesaid patent and the present application is based on the known principle of a rotatable casing that is fast with the drive shaft and includes a central oil chamber, two or more substantially radial cylinders continuous with said oil chamber, crank arms or eccentrics on the driven shaft located within the oil chamber and having pitman connections to pistons or plungers reciprocable in said cylinders, ducts or passages overrun by the pistons through which the oil in the crank chamber is thrown by centrifugal action to the outer ends of the cylinders, and throttle valves controlling the flow of oil from the outer ends of the cylinders to the oil chamber whereby when the valves are open the oil may be pumped back and forth between the oil chamber and the cylinder ends and the clutch is idle, and when the valves are closed, the oil is trapped in the outer ends of the cylinders so that the pistons cannot reciprocate and are thereby locked to the cylinders.

Among the objects of the present invention are, to provide a construction that, when the clutch is in operation, will avoid any unbalanced side thrusts on the shaft carrying the driving member of the clutch and consequent excessive wear on the bearings of said shaft, to provide a construction for equalizing the oil pressures in the ends of the several cylinders, to provide means for cushioning the oil when the throttle valves are closed and the cylinders and plungers are locked to each other to avoid sudden shock when such locking takes place, to provide a construction affording, when the clutch is in open or idle position, a central thrust on each of the several plungers from the crank shafts or eccentrics, thus securing uniform wear on the piston rings and cylinder walls and avoiding danger of breakage of the pitmen, to provide an improved throttle valve, and, as applied to automobile practice, to provide means by which the improvement can be readily applied to transmission shafts of different diameters or a differing number and/or spacing of splines.

One practical embodiment of the invention is illustrated in the accompanying drawings, in which—

Fig. 1 is a side elevation of my improved clutch mounted, for example, on an automobile transmission shaft, with a suitable housing therefor shown in section.

Fig. 2 is an enlarged vertical section on the line 2—2 of Fig. 1, showing the clutch in an idle or non-driving position.

Fig. 3 is a plan section on the line 3—3 of Fig. 2, through one of the cylinders, pistons and control valves.

Fig. 4 is a view similar to Fig. 2, but showing the clutch in a working or driving position.

Fig. 5 is a section taken on the irregular line 5—5 of Fig. 4.

Fig. 6 is a side elevation of one half section of the clutch casing as viewed in the direction of the arrow 6 of Fig. 1, and Fig. 7 is a vertical section through one side wall of the casing taken in the plane of the pressure equalizing and cushioning duct.

In the drawings, which illustrate an application of the invention to automobile practice, 10 designates the drive shaft which may be assumed to be the crank shaft of an automobile motor, secured to which by bolts 11 is the fly wheel 12 equipped with the usual large circumferential gear 13 that is driven by the starter. Attached to the forward face of the fly wheel 12 is a casing containing a body of oil and comprising complemental sections designated as entireties by 14 and 15, said sections having flanges 14' and 15' that are secured to the face of the fly wheel as by machine screws 16. The casing sections 14 and 15 are castings and are united by bolts 17 extending through mating flanges 18 and 19. In the section 14 is a cylinder 20 and in the section 15 is a similar cylinder 21, the axes of the cylinders being parallel and in a common plane parallel with the plane of the face of the fly wheel, but laterally offset from each other as shown in Figs. 2 and 4. In the cylinder 20 is a plunger 22, and in the cylinder 21 is a similar plunger 23.

24 designates the driven shaft, in this instance the transmission shaft, which is in axial alignment with the motor drive shaft 10, and, as shown in Fig. 5, extends centrally through the casing. A portion of this shaft 24 is formed with the usual longitudinal splines 25, that are engaged with an internally splined sleeve 26. This sleeve is formed at one end with an annular flange 27 that is secured by screws 28 to one end of a tubular member 29 that telescopes over the sleeve 26. The member 29 is formed with a central eccentric 30, and with twin eccentrics 31 respectively located on the opposite sides of the eccentric 30 and of diametrically opposed eccentricity to the latter. Engaged with the central eccentric 30, through an interposed bushing ring 32, is an eccentric ring composed of two halves 33 and 34 connected by bolts 35 (Figs. 2 and 4), and a pitman 36 integral with the ring member 33 is connected centrally to the plunger 22 by pivot pin 37 in the usual manner. The two side eccentrics 31 are engaged, through bushings 38, with two pairs of half eccentric rings 39 and 40 that are similarly bolted together, the ring sections 39 being continuous with the twin limbs of a forked pitman 41, the outer end of which is connected centrally to the plunger 23 by a pivot pin 42. As above stated, the central eccentric 30 and the twin side eccentrics 31 are diametrically opposed, so that, when the drive shaft 10 is rotated, the two plungers 22 and 23 are moved outwardly of their cylinders simultaneously through a one-half revolution of the casing, and are moved inwardly simultaneously through the other half revolution of the casing. In Fig. 2 the two plungers are shown at the extreme of their outward movement, and in Fig. 4 they are shown midway of their outward movement.

Cast integral with opposite inclined walls of the casing sections 14 and 15 are internal walls that, with the casing walls, define, as shown in Fig. 3, two chambers 43 and 44 separated by a transverse wall 45 that contains a ring of holes 46 and forms a seat for a rotary valve disc 47 likewise containing a ring of holes 48 adapted to move into and out of register with the holes 46 as the valve member is turned. The valve disc 47 has a stem 49 extending through the wall 45 and the outer wall of the casing, and the chamber 43 contains a conical coil spring 50 anchored at its base to a cap or plug 51 that closes the outer end of the chamber 43 and anchored at its inner end to the valved disc 47. This spring has two functions. It is under slight axial compression, by which it presses the valve disc snugly to its seat, and it is normally under sufficient torsional tension to normally hold the valve in the closed position indicated in Fig. 4, wherein the two groups of holes are out of register. As shown in Fig. 5, the chamber 43 communicates freely with the outer end of the cylinder 20, and as shown in Figs. 4 and 5, the chamber 44 is shut off from communication with the outer end of the cylinder 20, but is in free communication with the central oil chamber of the casing. Also, in the walls of the cylinders 20 and 21, at points opposite the valves last described, are ports 52 and 53 that are overrun by the plungers, and are closed by the plungers in all except about the last third of the inward travel and the first third of the outward travel of the latter. These ports I term filler ports because their function is to permit the flow under centrifugal action of oil from the central oil chamber to the chambers lying opposite the outer ends of the plungers, when the rotation of the casing by the engine shaft is started.

The two throttle valves 47 are, in automobile practice, simultaneously opened, against the closing urge of the springs 50, by mechanism operated by the usual clutch pedal. On the end of each valve stem 49 is an arm 54 (see Fig. 6) to which is pivoted at 55 the outer end of a warped link 56. The inner end of link 56 is pivoted at 57 to the corner of an elbow lever 58 (Fig. 5), one arm of which is pivoted at 59 to a lug on the outer wall of the casing, and the other arm of which carries a roller 60 that is engaged by a ring 61 having an anti-friction bearing on a sleeve 62 that in turn has a sliding bearing on a fixed sleeve 63 encircling the transmission shaft 24 and forming an extension of a head 64 that is adapted to be bolted to the transmission casing fragmentarily indicated in dotted outline in Fig. 1. As shown in Fig. 1, the sleeve 62 is grooved on opposite sides to receive the forked end of a shifting lever 65 operated by the usual clutch-shifting pedal.

At this point I will briefly outline the operation of the device as thus far described. The casing 10 is partly filled with a body of oil as indicated in Figs. 2 and 4. When the engine is started, under the rapid rotation of the casing in the direction of the arrow (Figs. 2 and 4) this body of oil is thrown outwardly by centrifugal force, flowing from the intermediate or crank case portion of the casing through filler ports 52, 53 into and flooding the outer end portions of the casing beyond the plungers. Prior to starting the motor the throttle valves 47 are opened by the pedal clutch through the shifter 65 so that, when the motor is started up with the throttle valves open, as shown in Fig. 2, and so long as the valves remain open, the oil can return freely to the crank case portion so that the plungers are not locked to the cylinders and consequently the resistance of the load merely causes the plungers to reciprocate idly in their cylinders as the casing and cylinders revolve, and no drive is imparted to the shaft 24. The clutch pedal is then released which permits the springs 50 to close the throttle valves 47, and on the next out stroke of the plungers as soon as they have overrun and closed the filler ports 52, 53, as shown in Fig. 4, the plungers cannot move outwardly any further, and the cylinders thus become locked through the plungers and pitmen to the eccentrics of the driven shaft 24, so that the drive is imparted to the latter, and coninues so long as the throttle valves remain closed. To disconnect the driving and driven members of the clutch it is necessary only to push the clutch pedal and open the throttle valves, which permits the oil to again flow freely between the crank case portion of the casing and the chambers beyond the outer ends of the cylinders and this intermits the clutch drive. The operation as thus far described is substantially the same as the operation of the clutch disclosed in my former patent above identified.

Turning now to certain items of improvement over the device of the said patent, I have, in the improved structure, incorporated certain features which both serve to equalize the pressures at the outer ends of the two plungers, and to cushion and thus render more gradual the starting of the transmission or driven shaft. The liquid being incompressible, and the opening and closing movements of the throttle valves being practically instantaneous, the car would start with a sudden jerk when the clutch is closed. To prevent this, I form in each of the plungers one or more pockets or air traps 66 opening through the outer end of the plunger, and I may also form in the cylinder walls similar pockets 67 opening through the outer end of the walls. As the oil enters these pockets, it traps more or less air in the closed ends of the pockets, so that, when the throttle valves are closed, the locking of the pistons to the cylinders is not instantaneous but gradual or yielding, permitting a gradual and smooth start of the car. The pressures of the oil at the outer ends of the two plungers are also equalized by a connecting duct 69 which may be drilled in the mating side walls of the casing sections 14 and 15, as shown in the sectional view Fig. 7, the adjacent ends of the two duct sections communicating through a short pipe section 70 that extends across the joint and thus prevents the loss of oil through said joint. The outer ends of the duct sections 69 communicate with the valve chambers 43, as shown in Figs. 5 and 7, and as the oil floods the chambers 43 during the idle rotation of the driving clutch member, this oil, flowing into the ducts 69, also traps a body of air which contributes a cushioning effect to that created by the pockets 66 and 67, as well as equalizing the pressures on the outer ends of the plungers.

In the construction illustrated in my former patent above identified, wherein a pair of relatively off-set crank arms are employed on the driven shaft, the pitmen are connected with the pistons or plungers eccentrically of the latter. Such eccentric or off-center connection imparts a tipping tendency to the plungers and causes undue wear on the plunger rings and cylinder walls and also imparts a lateral bending or breaking stress to the pitmen. My present construction avoids all this by providing a central connection of both pitmen to their respective plungers through the use of the centralized eccentric mechanism described. This feature, when employed with opposed cylinders whose axes are in a common plane normal to the axis of the drive shaft, and, as in the construction herein illustrated and described, parallel with the plane of the face of the fly wheel to which the casing containing the cylinders is attached, avoids any unbalanced side thrusts on the drive shaft and consequent excessive wear on the bearings of the drive shaft.

The throttle valve construction constitutes a further improvement over the butterfly type disclosed in my former patent as it is more positive in action and is able to utilize the double function of a single valve-closing spring as above described.

The detachable and substitutional sleeve connection or adapter 26 of the eccentric carrying member 29 to the driven shaft is valuable, as permitting the application of this clutch to different makes of cars wherein either the diameter or the number and/or spacing of the splines of the transmission shaft may vary; it only being necessary to provide a number of adapters 26 all of a size to fit within the eccentric carrier 29 but varied as to internal diameter and number and/or spacing of splines to suit the different conditions of use in different makes of cars.

This specification and the drawings accompanying the same disclose one practical and approved physical embodiment of the invention. Changes in the details of structure and arrangement may be resorted to within the scope and purview of the appended claims.

I claim:

1. In a hydraulic clutch of the type described, the combination of a drive shaft, a driven shaft aligned with said drive shaft, a casing fast with said drive shaft, said casing containing a central chamber and a pair of cylinders disposed respectively on opposite sides of said chamber and open at their inner ends to the latter, plungers in said cylinders, connections between said plungers and said driven shaft operative to idle said plungers in said cylinders when the clutch is in non-driving condition and to lock said plungers to said cylinders when the clutch is in driving condition, a body of liquid in said casing, filler ports in the walls of said cylinders and overrun by said plungers through which ports liquid flows into the outer ends of said cylinders when said ports are uncovered, throttle valves controlling the return flow of liquid from the outer ends of said cylinders to said central chamber, and a pressure equalizing duct connecting the outer ends of said cylinders.

2. An embodiment of claim 1, wherein the pressure equalizing duct is formed in a wall of the casing.

3. An embodiment of claim 1, wherein the outer ends of the cylinders are each open to a space within the casing adapted to receive both liquid and air and the ends of the pressure equalizing duct communicate with said spaces whereby the liquid entering said duct traps air to form an air cushion.

4. An embodiment of claim 1, wherein the outer ends of the cylinders are open to spaces within the casing adapted to receive both liquid and air and the plungers are each formed with a pocket opening through its outer face in which air is trapped by the liquid to form an air cushion.

5. An embodiment of claim 1, wherein the outer ends of the cylinders are open to spaces within the casing adapted to receive both liquid and air and the cylinder walls are each formed with a pocket opening through its outer end in which air is trapped by the liquid to form an air cushion.

6. In a hydraulic clutch of the type described, the combination of a drive shaft, a driven shaft aligned with said drive shaft, a casing fast with said drive shaft, said casing containing a central chamber and a pair of cylinders disposed respectively on opposite sides of said chamber and open at their inner ends to the latter, plungers in said cylinders, connections between said plungers and said driven shaft operative to idle said plungers in said cylinders when the clutch is in non-driving condition and to lock said plungers to said cylinders when the clutch is in driving condition, a body of liquid in said casing, filler ports in the walls of said cylinders and overrun by said plungers through which ports liquid flows into the outer ends of said cylinders when said ports are uncovered, and means controlling the return flow of liquid from the outer ends of said cylinders to said central chamber, said controlling means comprising a wall separating the outer end of each cylinder from said central chamber and having a port, a flat valve in sliding contact with said wall and having a port movable into and out of register with the port of said wall, a spring urging said valve to closed position, and manually operable means for opening said valve against the urge of said spring.

7. An embodiment of claim 6, wherein the means controlling the return flow of liquid comprises a wall separating the outer end of each cylinder from said central chamber and having a port, a valve stem journaled in said wall, a disc valve fast on said stem and having a port movable into and out of register with the port of said wall under a turning movement of said valve, a spring urging said valve to closed position, and manually operable means connected to said valve stem for opening said valve against the urge of said spring.

8. An embodiment of claim 6, wherein the means controlling the return flow of liquid comprises a wall separating the outer end of each cylinder from said central chamber and having a ring of ports, a valve stem journaled in said wall centrally of said ring of ports, a disc valve fast on said stem and having a ring of ports movable into and out of register with the ports of said wall under a turning movement of said valve, a spring pressing said valve to its seat on said wall and also urging said valve to closed position, and manually operable means connected to said valve stem for opening said valve against the urge of said spring.

9. In a hydraulic clutch of the type described, the combination of a drive shaft, a driven shaft aligned with said drive shaft and having a splined portion, a casing fast with said drive shaft, said casing containing a central chamber and cylinders on opposite sides of said central chamber and open at their inner ends to the latter, plungers in said cylinders, a tubular hub member in said casing carrying eccentrics, pitmen connections between said eccentrics and plungers, a body of liquid in said casing, means controlling the flow of liquid between said central chamber and the outer ends of said cylinders through which the clutch is rendered operative or idle, and an internally splined adapter member engaged with the splined portion of said driven shaft and detachably secured to said hub member through which rotary movement of said eccentrics is transmitted to said driven shaft.

10. An embodiment of claim 9, wherein the adapter member consists of an internally splined sleeve engaged with the splined portion of said driven shaft and fitting within and non-rotatable relatively to said hub member.

11. An embodiment of claim 9, wherein the adapter member consists of an internally splined sleeve engaged with the splined portion of said driven shaft and fitting within said hub member and having on one end thereof a flange detachably fastened to one end of said hub member.

12. In a hydraulic clutch of the type described, the combination of a drive shaft, a driven shaft aligned with said drive shaft, a casing fast with said drive shaft, said casing containing a central chamber and a pair of cylinders disposed respectively on opposite sides of said chamber and open at their inner ends to the latter, plungers in said cylinders, oppositely disposed eccentric members fast on said driven shaft and pitman connections therefrom to said plungers, said eccentric members and pitman connections comprising a central eccentric and a pitman connecting the same with one of said plungers at the transverse center of the latter, and twin eccentrics disposed respectively on opposite sides of said central eccentric and a forked pitman straddling said central eccentric and connecting said twin eccentrics with the other plunger at the transverse center of the latter, a body of liquid in said casing, filler ports in the walls of said cylinders overrun by said plungers through which ports liquid flows into the outer ends of said cylinders when said ports are uncovered, and throttle valves controlling the return flow of liquid from the outer ends of said cylinders to said central chamber.

FREDERICK RODEGHIER.